United States Patent
Woley et al.

(10) Patent No.: US 10,496,235 B2
(45) Date of Patent: *Dec. 3, 2019

(54) POWER EFFICIENT APPLICATION NOTIFICATION SYSTEM

(71) Applicant: Microsoft Technology Licensing, LLC, Redmond, WA (US)

(72) Inventors: Kevin Michael Woley, Seattle, WA (US); Won Hee Lee, Issaquah, WA (US); Gaurav S. Anand, Seattle, WA (US); Nathan J. Kuchta, Bothell, WA (US); Evgeny Skarbovsky, Sammamish, WA (US); Chandramouli N. Srinivasan, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 385 days.

This patent is subject to a terminal disclaimer.

(21) Appl. No.: 15/268,350

(22) Filed: Sep. 16, 2016

(65) Prior Publication Data

US 2017/0003832 A1 Jan. 5, 2017

Related U.S. Application Data

(63) Continuation of application No. 13/398,212, filed on Feb. 16, 2012, now Pat. No. 9,448,680.

(51) Int. Cl.
*G06F 3/048* (2013.01)
*G06F 1/32* (2019.01)
(Continued)

(52) U.S. Cl.
CPC .......... *G06F 3/0481* (2013.01); *G06F 1/3209* (2013.01); *G06F 1/329* (2013.01);
(Continued)

(58) Field of Classification Search
CPC .......... G06F 1/3203; G06F 1/329; G06F 8/65; G06F 1/3262; G06F 1/3265; G06F 1/3287

See application file for complete search history.

(56) References Cited

U.S. PATENT DOCUMENTS

| 6,335,742 B1 | 1/2002 | Takemoto |
| 7,673,244 B2 | 3/2010 | Zukowski et al. |

(Continued)

FOREIGN PATENT DOCUMENTS

| CN | 101861562 | 10/2010 |
| CN | 102356555 | 2/2012 |

(Continued)

OTHER PUBLICATIONS

"Advisory Action", U.S. Appl. No. 13/398,212, dated Mar. 11, 2016, 3 pages.

(Continued)

*Primary Examiner* — Sang H Kim
(74) *Attorney, Agent, or Firm* — Newport IP, LLC; Michael Ryan Cicero

(57) ABSTRACT

Applications on a computing device provide notifications associated with the application to a notification system. A notification includes an identification of content to be presented for the notification and an indication of when the content is to be presented. The notification system presents the notification content at the appropriate time regardless of whether the application is executing and without resuming execution of the application if the application is not running. Various power efficiency techniques are also used to determine which notifications are presented and when a user interface is updated to reflect those notifications in order to (Continued)

avoid updating the user interface to reflect notifications that would not be observable (e.g., due to a power mode of the computing device).

20 Claims, 6 Drawing Sheets

(51) Int. Cl.
- *G06F 9/54* (2006.01)
- *G06F 9/44* (2018.01)
- *H04M 1/725* (2006.01)
- *G06F 3/0481* (2013.01)
- *G06F 1/3209* (2019.01)
- *G06F 1/3228* (2019.01)
- *G06F 1/329* (2019.01)
- *G06F 1/3296* (2019.01)
- *G06F 3/01* (2006.01)
- *G06F 3/16* (2006.01)
- *G06F 9/451* (2018.01)

(52) U.S. Cl.
CPC .......... *G06F 1/3228* (2013.01); *G06F 1/3296* (2013.01); *G06F 3/016* (2013.01); *G06F 3/048* (2013.01); *G06F 3/167* (2013.01); *G06F 9/451* (2018.02); *G06F 9/452* (2018.02); *G06F 9/542* (2013.01); *H04M 1/72522* (2013.01); *G06F 2209/545* (2013.01); *H04M 1/72544* (2013.01); *Y02D 10/24* (2018.01)

(56) References Cited

U.S. PATENT DOCUMENTS

| | | | |
|---|---|---|---|
| 8,078,856 | B1 | 12/2011 | Righi et al. |
| 8,520,030 | B2 | 8/2013 | Barrett |
| 9,448,680 | B2 | 9/2016 | Woley et al. |
| 2004/0059964 | A1 | 3/2004 | Grover et al. |
| 2005/0188406 | A1* | 8/2005 | Gielow ............ H04L 29/06027 725/81 |
| 2006/0179408 | A1 | 8/2006 | Ko |
| 2007/0157108 | A1 | 7/2007 | Bishop |
| 2008/0098093 | A1* | 4/2008 | Simon ................ H04L 67/325 709/219 |
| 2008/0163261 | A1 | 7/2008 | Kimura et al. |
| 2009/0098889 | A1 | 4/2009 | Barcklay et al. |
| 2009/0259957 | A1 | 10/2009 | Slocum et al. |
| 2010/0023874 | A1 | 1/2010 | Frohwein |
| 2010/0107150 | A1 | 4/2010 | Kamada et al. |
| 2010/0135201 | A1 | 6/2010 | Lewis et al. |
| 2010/0146437 | A1 | 6/2010 | Woodcock et al. |
| 2010/0269059 | A1* | 10/2010 | Othmer ............ G06Q 30/0243 715/774 |
| 2011/0076992 | A1 | 3/2011 | Chou et al. |
| 2011/0248863 | A1* | 10/2011 | Johnson ............... G08B 27/006 340/686.1 |
| 2011/0250971 | A1 | 10/2011 | van Os et al. |
| 2011/0270940 | A1 | 11/2011 | Johnson et al. |
| 2011/0300846 | A1 | 12/2011 | Chiu et al. |
| 2012/0023226 | A1 | 1/2012 | Petersen et al. |
| 2012/0046079 | A1 | 2/2012 | Kim et al. |
| 2012/0166452 | A1 | 6/2012 | Tseng |
| 2012/0272230 | A1* | 10/2012 | Lee .................... G06F 1/329 717/173 |
| 2013/0219332 | A1 | 8/2013 | Woley |

FOREIGN PATENT DOCUMENTS

| | | |
|---|---|---|
| JP | 1196194 | 4/1999 |
| JP | 2000270312 A | 9/2000 |
| JP | 2008227727 | 9/2008 |
| JP | 2008305240 | 12/2008 |
| JP | 2010062930 | 3/2010 |
| JP | 2010065752 | 3/2010 |
| JP | 2010067023 | 3/2010 |
| JP | 2010178239 | 8/2010 |
| JP | 2010537343 | 12/2010 |
| JP | 2011100279 | 5/2011 |
| JP | 2011516936 | 5/2011 |
| WO | 2009117372 A1 | 9/2009 |

OTHER PUBLICATIONS

"Corrected Notice of Allowance", U.S. Appl. No. 13/398,212, dated Jul. 7, 2016, 13 pages.
"Extended European Search Report", EP Application No. 13748694.0, dated Oct. 9, 2015, 6 pages.
"Final Office Action", U.S. Appl. No. 13/398,212, dated Oct. 21, 2014, 29 pages.
"Final Office Action", U.S. Appl. No. 13/398,212, dated Dec. 2, 2013, 20 pages.
"International Search Report and Written Opinion", Application No. PCT/US2013/025799, dated Apr. 29, 2013, 9 pages.
"Non-Final Office Action", U.S. Appl. No. 13/398,212, dated Jun. 13, 2014, 26 pages.
"Non-Final Office Action", U.S. Appl. No. 13/398,212, dated Jun. 24, 2015, 32 pages.
"Non-Final Office Action", U.S. Appl. No. 13/398,212, dated Jul. 8, 2013, 16 pages.
"Notice of Allowance", U.S. Appl. No. 13/398,212, dated May 6, 2016, 16 pages.
"Push Notifications", Urban Airship: Powering Modern Mobile, Jun. 20, 2011, 4 pages.
"Using Push Notifications", Retrieved from: http://msdn.microsoft.com/en-us/library/windows/apps/hh465460.aspx—Feb. 12, 2012, 6 pages.
Costello, "iPhone Push Notifications Definition", Retrieved from: http://ipod.about.com/od/iphonesoftwareterms/g/iphone-push-notifications.htm—Feb. 3, 2012, 1 page.
Courbanou, "Microsoft Builds Windows Push Notification for Windows 8", Retrieved from: http://www.thevarguy.com/2011/11/07/microsoft-builds-windows-push-notification-service-for-windows-8/, Nov. 7, 2011, 10 pages.
"Foreign Office Action", CN Application No. 201380009590.8, dated Dec. 26, 2016, 16 pages.
"Final Office Action", U.S. Appl. No. 13/398,212, dated Nov. 23, 2015, 35 pages.
"Foreign Office Action", JP Application No. 2014-557730, dated Dec. 6, 2016, 6 pages.
"Office Action Issued in European Patent Application No. 13748694.0", dated Nov. 5, 2018, 5 Pages.
"Office Action Issued in Japanese Patent Application No. 2017-042004", dated Jun. 5, 2018, 10 Pages.

* cited by examiner

POWER EFFICIENT APPLICATION NOTIFICATION SYSTEM

RELATED APPLICATION

This application is a continuation of and claims priority to U.S. patent application Ser. No. 13/398,212 filed Feb. 16, 2012, the disclosure of which is incorporated by reference herein in its entirety.

BACKGROUND

As computers have become increasingly commonplace and interconnected, the number of applications available to users has also increased. However, interaction with applications can be difficult and frustrating for users due to the number of applications that are installed on the computer. This interaction can include locating an application of interest as well as accessing functionality of the application. For instance, a user may select a weather application to get weather information, then interact with a news application to catch up on the latest news, and so on through a number of other applications. Consequently, navigation through these applications to locate desired information may take a significant amount of time, which may be further complicated by the number of applications that are available on the computing device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, both metadata for a notification associated with an application and content for the notification are received at a device. A user interface (UI) is updated at the device to present the content for the notification without executing or resuming execution of the application. The time at which the UI is updated is based at least in part on an indication included in the metadata of when to present the content.

In accordance with one or more aspects, an identification of content for a notification associated with an application is provided to a notification system of a computing device. The notification is to be presented by the notification system regardless of whether execution of the application is terminated or suspended at a time of presentation of the content. Metadata for the notification is also provided to the notification system, the metadata indicating when the content for the notification is to be presented.

BRIEF DESCRIPTION OF THE DRAWINGS

The same numbers are used throughout the drawings to reference like features.

DETAILED DESCRIPTION

A power efficient application notification system is discussed herein. A computing device includes one or more applications and a notification system, and the applications provide notifications to the notification system. A notification includes the content (or an indication of where to obtain the content) that is to be presented for the notification. The notification also includes an indication of when the content is to be presented, and optionally various additional metadata (e.g., a lifetime or expiration time for the notification, a type of the notification, and so forth). The notification system presents the notification content at the appropriate time regardless of whether the application is running and without resuming execution of the application if the application is not running. Various power efficient techniques are also used to determine which notifications are presented and when a user interface (UI) is updated to reflect those notifications in order to avoid updating the UI to reflect notifications that would not be observable (e.g., due to a power mode of the computing device).

Figure 1:
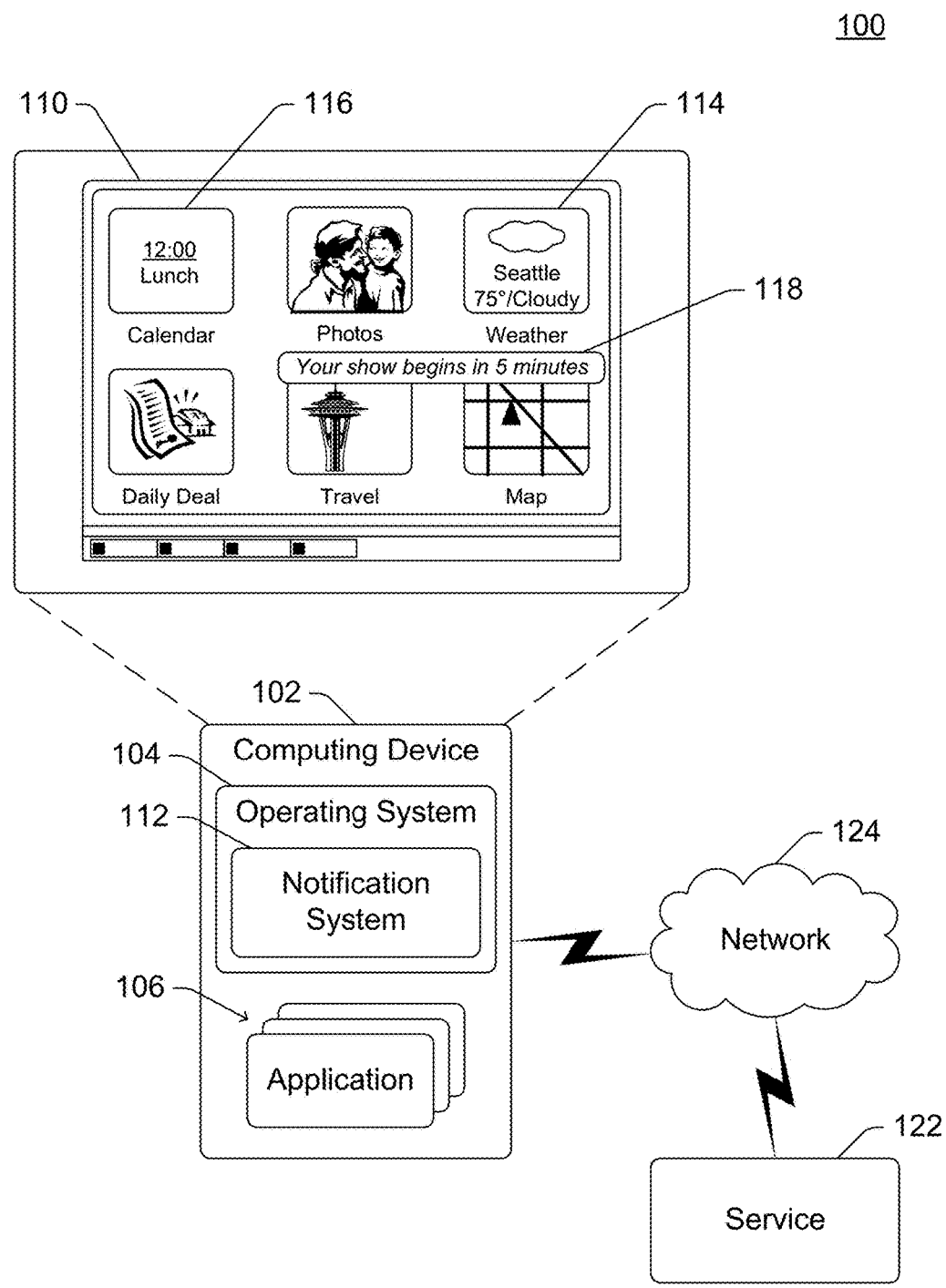
FIG. 1 illustrates an example system implementing the power efficient application notification system in accordance with one or more embodiments.

FIG. 1 illustrates an example system 100 implementing the power efficient application notification system in accordance with one or more embodiments. System 100 includes a computing device 102, which can be any of a variety of different types of devices, such as a physical device or a virtual device. For example, computing device 102 can be a physical device such as a desktop computer, a server computer, a laptop or netbook computer, a tablet or notepad computer, a mobile station, an entertainment appliance, a set-top box communicatively coupled to a display device, a television or other display device, a cellular or other wireless phone, a game console, an automotive computer, and so forth. Computing device 102 can also be a virtual device, such as a virtual machine running on a physical device. A virtual machine can be run on any of a variety of different types of physical devices (e.g., any of the various types listed above). Thus, computing device 102 may range from a full resource device with substantial memory and processor resources (e.g., personal computers, game consoles) to a low-resource device with limited memory and/or processing resources (e.g., traditional set-top boxes, hand-held game consoles).

Computing device 102 includes an operating system 104. Operating system 104 is configured to abstract underlying functionality of computing device 102 to one or more applications 106 that are executable on computing device 102. For example, operating system 104 may abstract processing, memory, network, display and/or or other presentation functionality of computing device 102 such that applications may be written without knowing "how" this underlying functionality is implemented. Each application 106, for instance, may provide data to operating system 104 to be rendered and displayed by a display device 110 without understanding how this rendering will be performed.

Operating system 104 may also include a variety of other functionality, such as to manage a file system and a user interface (UI) that is navigable by a user of computing device 102. An example of this is illustrated as an application launcher (e.g., desktop) that is displayed on display device 110 of computing device 102. The desktop includes representations of multiple ones of applications 106, such as icons, tiles, textual descriptions, and so on. The desktop may be considered a root level of a hierarchical file structure. The representations shown in the illustrated example are selectable to launch a corresponding one of applications 106 for execution on computing device 102. In this way, a user may readily navigate through a file structure and initiate execution of applications of interest. Although only six representations (one for a calendar application, one for a photos application, one for a weather application, one for a daily deal application, one for a travel application, and one for a map application) are illustrated in FIG. 1, it should be noted that a user can scroll through the representations to have representations for different applications displayed on display device 110. Various user inputs can be provided to scroll through the representations.

Operating system 104 is also illustrated as including a notification system 112. Notification system 112 manages notifications that are to be displayed as part of a UI displayed on display device 110. Notification system 112 can support different types of notifications, such as notifications that are representations of applications 106. For example, a representation 114 of a weather application is illustrated as including a notification that indicates a name and current weather conditions, e.g., "Seattle 75°/Cloudy." Similarly, a representation 116 for a calendar application is illustrated as including a notification that indicates that a next scheduled appointment is at 12:00 for "Lunch". In this way, a user may readily view information relating to the applications 106 without having to launch and navigate through each of the applications. Although representations of specific applications are shown, other representations of applications can alternatively be used, such as a representation of an application that references a user's involvement with a service, e.g., a friend in a social network service.

Notification system 112 can also support other types of notifications. One such type of notification is a pop-up or temporary notification that can be displayed, which may also be referred to as "toast". Such a pop-up or temporary notification can be displayed in addition to (or in place of) representations of applications 106. Such a pop-up or temporary notification can optionally be selectable to launch a corresponding one of applications 106 for execution on computing device 102. For example, a pop-up notification 118 can be displayed temporarily to notify a user of an upcoming movie (e.g., "Your show begins in 5 minutes").

In one or more embodiments, notification system 112 allows no more than a threshold number of notifications associated with an application to be presented at any particular time. This threshold number can be, for example, one notification although alternatively other threshold numbers can be used. When the threshold number of notifications are already presented, notification system 112 replaces one notification with a new notification. The new notification is the notification to be presented, and the replaced notification is the previously presented notification. If multiple notifications can be presented concurrently, then the replaced notification can be determined in different manners (e.g., the notification that began being presented least recently can be the replaced notification). For example, assume the notification of "12:00 Lunch" was previously displayed as included in representation 116, and another notification (e.g., displaying "3:00 teleconference) is to be displayed at a particular time. At that particular time, the other notification (displaying "3:00 teleconference") is displayed as included in representation 116, replacing the notification of "12:00 Lunch" displayed as included in representation 116.

Generally, notification system 112 receives notification data for notifications from applications 106. The notification data includes an indication of notification content, which is the content to be presented (e.g., displayed) for the notification. The content is oftentimes displayed, but can also be presented in other manners (e.g., played back audibly, using haptic technology, etc.). Presenting the content for the notification is also referred to as presenting the notification. The notification also includes an indication of when (e.g., a date and time) the notification is to be presented. Notification system 112 maintains a record of the notifications and presents the notifications at the appropriate times.

Notification system 112 employs various power efficiency techniques to determine which notifications are presented, and when the UI displayed on display device 110 is updated to reflect those notifications in order to avoid updating the UI to reflect notifications that would not be displayed (e.g., due to a power mode of computing device 102). Notification system 112 can manage the notifications without further input from applications 106, allowing the notifications associated with applications 106 to be displayed or otherwise presented without executing or resuming execution of applications 106. A notification provided by an application 106 can be presented by notification system 112 regardless of whether the application 106 is executing at the time of presentation of the notification. Power efficiency and thus battery life of computing device 102 can be thus be improved by not running each of applications 106 to display or otherwise present the notifications.

Operating system 104 and applications 106 can receive user inputs from a user of computing device 102. User inputs can be provided in a variety of different manners, such as by pressing one or more keys of a keypad or keyboard of device 102, pressing one or more keys of a controller (e.g., remote control device, mouse, trackpad, touchpad, etc.) of device 102, pressing a particular portion of a touchpad or touchscreen of device 102, making a particular gesture on a touchpad or touchscreen of device 102, and/or making a particular gesture on a controller (e.g., remote control device, mouse, trackpad, touchpad, etc.) of device 102. User inputs can also be provided via other physical feedback input to device 102, such as tapping any portion of device 102, bending or twisting device 102, an action that can be recognized by a motion detection component of device 102 (such as shaking device 102, rotating device 102, etc.), and so forth. User inputs can also be provided in other manners, such as via voice or other audible inputs to a microphone, via motions of hands or other body parts observed by an image capture device, and so forth.

Computing device 102 can optionally communicate with one or more services 122 via a network 124, obtaining notification data from a service 122. Network 124 can be a variety of different networks, including the Internet, a local area network (LAN), a public telephone network, an intranet, other public and/or proprietary networks, combinations thereof, and so forth. Service 122 can be implemented using one or more of a variety of different types of computing devices, ranging from full resource devices with substantial memory and processor resources to low-resource devices with limited memory and/or processing resources analogous to the discussion above regarding computing device 102.

Although notification system 112 is discussed with reference to incorporation of notification system 112 in operating system 104, functionality of notification system 112 can be implemented at least in part in one or more other modules of computing device 102 or another device. For example, an additional module included as part of computing device 102 but external to operating system 104 can implement at least part of notification system 112. By way of another example, notification system 112 can be implemented at least in part by a service 122.

Figure 2:
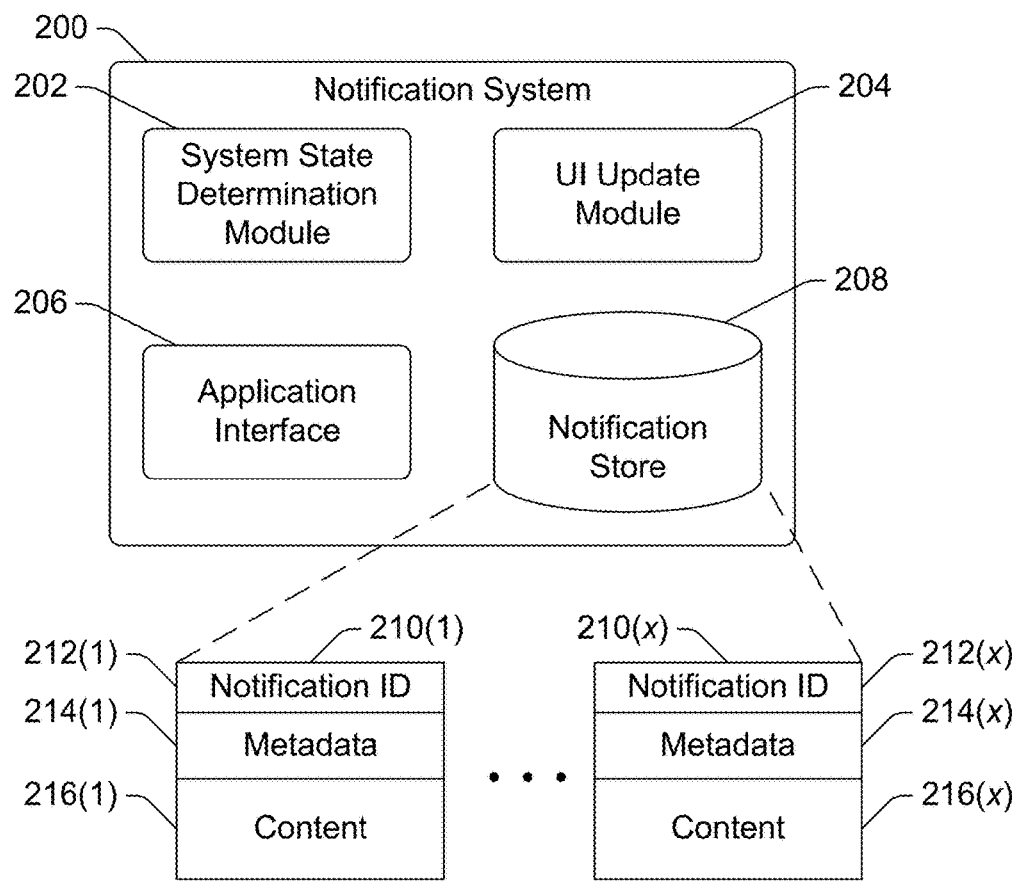
FIG. 2 illustrates an example notification system in accordance with one or more embodiments.

FIG. 2 illustrates an example notification system 200 in accordance with one or more embodiments. Notification system 200 can be, for example, a notification system 112 of FIG. 1. Notification system 200 includes a system state determination module 202, a UI update module 204, an application interface 206, and a notification store 208.

System state determination module 202 determines a current system state of the computing device displaying the notifications. The current system state refers to an indication of current usage and/or settings of the computing device. For example, the current system state can refer to a current power mode of the computing device (e.g., a low power mode, a sleep mode, a hibernate mode, a maximum performance mode, etc.). By way of another example, the current system state can refer to resource availability, such as whether a display device is powered on or powered off, whether a network connection (e.g., a connection to network 124 of FIG. 1) is available, and so forth. By way of another example, the current system state can refer to device access settings, such as whether the computing device is locked (e.g., in which case a password, gesture, or other user input is provided in order for the user of the computing device to resume interacting with applications). System state determination module 202 can obtain the system state in various manners, such as from one or more modules of an operating system running on the computing device (e.g., operating system 104 of FIG. 1), by monitoring various events on the computing device, and so forth.

UI update module 204 updates the UI at the appropriate times to display or otherwise present notifications. This display and/or presentation can include displaying a notification on a display device (e.g., display device 110 of FIG. 1), playing back audio data via one or more speakers, providing haptic feedback (e.g., vibrating or shaking the computing device), and so forth. The appropriate times to display or otherwise present notifications are dependent on the notifications themselves, as well as the current system state, as discussed in more detail below.

Application interface 206 is an interface allowing applications (e.g., applications 106 of FIG. 1) to provide notifications to notification system 200. In one or more embodiments, application interface 206 is an application programming interface (API) exposing one or more methods that can be invoked by the applications. Alternatively, various other data communication techniques can be employed to provide notifications to notification system 200, such as writing data describing the notifications in a common storage location accessible to both notification system 200 and the applications, sending data describing the notifications via various messaging or event communication systems, and so forth.

A notification provided to notification system 200 by an application includes both content and metadata for the notification. The content and the metadata for the notification can collectively be referred to as the notification data. The content for the notification refers to the content that is displayed or otherwise presented as the notification. Alternatively, rather than including the content itself, the notification can include an indication of where to obtain the content. This indication can be an identifier of a location on the computing device running the application (e.g., a path identifying a file in a file system, a uniform resource locator (URL), uniform resource indicator (URI), etc.), or alternatively another device or service (e.g., URL, URI, or other link identifying a service from which the content can be obtained via a network).

The metadata for the notification refers to one or more indications indicating when and/or how the notification content is to be presented. In one or more embodiments, the metadata for the notification includes an indication of when the notification is to be presented. This indication can be in various forms, such as a date and/or time that the notification is to be presented. The metadata can also include an indication of a frequency with which the content for the notification is to be changed (e.g., if the indication of where to obtain the content is a URL to a service, then a frequency with which the content is to be obtained from that service). The metadata for the notification can also include a lifetime for the notification (e.g., an expiration date and/or time after which the notification is to no longer be presented, a duration (e.g., days or hours) for which the notification is to be presented or after which the notification is to no longer be presented, etc.). Notification system 200 does not present the notification after the lifetime of the notification has elapsed, and can delete the notification (e.g., from notification store 208 discussed below) after the lifetime of the notification has elapsed. The metadata for the notification can also include an indication of the type of the notification, such as whether the notification is a representation (e.g., tile or icon) for an application, a pop-up or temporary notification, and so forth.

Each notification also includes an indication of the application providing the notification to notification system 200. The indication of the application is typically included in the metadata for the notification, but can alternatively be provided in other manners. The application providing the notification is also referred to as the application associated with or corresponding to the notification.

Alternatively, at least some of the metadata can be inherent in the manner in which the application provides the notification to notification system 200. For example, application interface 206 can expose a different API method for each different type of notification (e.g., one method if the notification is a representation (e.g., the or icon) of an application, another method if the notification is a pop-up or temporary notification, etc.). By way of another example, application interface 206 can expose one API method for notifications having a lifetime of 1 hour, another API method for notifications having a lifetime of 1 day, and so forth.

The notifications provided to notification system 200 are maintained in notification store 208, illustrated as multiple (x) notifications 210 in FIG. 2. Notification system 200 can optionally place a limit on the number of notifications (e.g., 4096 notifications) maintained in notification store 208 for each application. Notification store 208 can maintain notifications in any of a variety of different manners. Notification store 208 maintains the notifications in persistent memory (e.g., nonvolatile memory), allowing notifications to be maintained across various power state transitions (e.g., rebooting or resetting the computing device). Notification store 208 can maintain notifications in a manner allowing the next notification to be displayed for an application to be readily identified, such as maintaining a pointer or identifier to the next notification to be displayed for each application, maintaining the next notification to be displayed for each application as a first or top notification in a list or record, and so forth.

Each notification 210 includes a notification identifier (ID) portion 212, a metadata portion 214, and a content portion 216. Notification ID portion 212 includes an identifier of the notification 210. The identifier of the notification can take various forms, such as an identifier assigned by the application providing the notification to notification system 200 to allow different notifications from the application to be distinguished from one another (and which, in combination with an identifier of the application, can be used to allow different notifications to be distinguished from one another by notification system 200), an identifier assigned by notification system 200 to allow different notifications to be distinguished from one another by notification system 200, a timestamp (e.g., date and time of receipt) for the notification, and so forth. Metadata portion 214 includes the metadata for the notification, provided by the application as discussed above. Content portion 216 includes the content for the notification (or indication of where the content can be obtained), provided by the application as discussed above.

It should be noted that, after the notification is provided to notification system 200, notification system 200 has the information allowing it to display or otherwise present the notification at the appropriate time. UI update module 204 displays or otherwise presents the notification at the appropriate time without further execution of the application. For example, an application can provide the notification to notification system 200, and then execution of the application can be terminated or suspended (e.g., the application may remain in memory of the computing device but is not scheduled for execution by the processor of the computing device). UI update module 204 displays or otherwise presents the notification at the appropriate time, even though the application is terminated or suspended.

In one or more embodiments, application interface 206 also allows applications to delete and/or modify previously provided notifications. An application can delete and/or modify a notification by providing a notification of the deletion or modification in any of a variety of different manners (e.g., by invoking APIs) analogous to the discussion above regarding providing notifications to notification system 200. A previously provided notification can be modified by the application providing data indicating changes to be made to the previously provided notification, or by the application providing a new notification that replaces the previously provided notification. Previously provided notifications can be identified in different manners, such as by their notification IDs 212.

UI update module 204 displays or otherwise presents the notification at the appropriate time by updating the UI to reflect (e.g., display or present) the notification. UI update module 204 determines, based on various criteria, the appropriate time to update the UI to present a notification. In using these various criteria, UI update module 204 takes into account various power efficiency techniques to conserve power in the computing device. Generally, UI update module 204 updates the UI to present a notification at the time indicated in the notification (e.g., the indication of when the notification is to be displayed as indicated in metadata for the notification), but only if the notification would be observable at (e.g., visible to or heard by, and thus useful to, a user of) the computing device. If the notification would not be observable at the computing device (e.g., due to a power mode of the computing device), then UI update module 204 does not update the UI to present the notification at the time indicated in the notification.

It should be noted that UI update module 204 not updating the UI to present the notification refers to UI module 204 making a determination to not update the UI, such as determining to not update the UI if the display device is powered off as discussed below. UI update module 204 not updating the UI to present the notification also refers to UI update module 204 not running in certain situations (e.g., if the computing device is in a low power mode). Thus, UI update module 204 not updating the UI to present the notification refers to both an active determination by module 204 to not update the UI, as well as module 204 not running and thus not being able to make a determination as to whether to update the UI.

Various different situations can exist in which a notification would not be observable at the computing device. In one or more embodiments, UI update module 204 identifies one or more power modes for which a notification would not be observable at the computing device. Generally, these one or more power modes are low power modes in which any one or more of various resources (e.g., processors, storage devices, input/output (I/O) components, etc.) of the computing device are running in a lower power mode (e.g., consuming less than a threshold amount of power or energy). These one or more power modes can have various names or labels, such as a hibernate mode, a suspend mode, a connected standby mode, an idle mode, and so forth. UI update module 204 can be configured with an indication of these one or more power modes. A user or administrator of the computing device could also optionally provide an input identifying at least one of these one or more power modes.

In one or more embodiments, UI update module 204 determines that a notification would not be observable at the computing device if a display device of the computing device (e.g., display device 110 of FIG. 1) is powered off. Additionally, or alternatively, UI update module 204 can also determine that a notification would not be observable at the computing device if other hardware or resources were unavailable. For example, if a notification were to be played back audibly to a user, then UI update module 204 can determine that a notification would not be observable at the computing device if a speaker of the computing device is powered off or muted.

In one or more embodiments, UI update module 204 determines that a notification would not be observable at the computing device if notification system 200 does not have access to the content for the notification. For example, if a notification indicates that content is to be obtained from a particular URL, and notification system 200 is not connected to a network via which that particular URL can be accessed, then UI update module 204 determines that a notification would not be observable at the computing device.

In one or more embodiments, UI update module 204 determines that a notification would not be observable at the computing device if a representation of the application associated with the notification is not being presented. For example, the computing device can display a "lock" screen and prevent users from accessing applications or other functionality of the computing device until the computing device is unlocked. The computing device can be unlocked in various manners with various user inputs, such as a user input of a passphrase or personal identification number (PIN), a particular user gesture (e.g., swiping a finger across the screen), and so forth. When displaying the lock screen, representations of some applications can be displayed, although the user would not be able to scroll through the representations. UI update module 204 can determine that if a representation of the application associated with the notification is not displayed on the lock screen, then the notification would not be observable at the computing device (until the computing device is unlocked). By way of another example, representations of applications can be displayed on different pages (or other collections or groupings) that the user can scroll or otherwise navigate through (such as a start page and one or more additional pages). UI update module 204 can determine that if the page (or other collection or grouping) being displayed at any given time does not include a representation of the application associated with the notification, then the notification would not be observable at the computing device at that given time.

It should be noted that UI update module 204 can optionally apply different rules to different types of notifications, treating the different types of notifications differently. Notification system 200 can support different types of notifications, such as a representation of an application (e.g., tile or icon for an application), a pop-up or temporary notification (e.g., toast), and so forth as discussed above. In one or more embodiments, if UI update module 204 determines that a notification would not be observable at the computing device, then UI update module 204 can change the computing device settings so that the notification would be observable at the computing device. The type of a particular notification is identified by the application providing the notification to notification system 200 (e.g., based on the method of an API of application interface 206 that is invoked by the application, indicated in metadata for the notification, and so forth). UI update module 204 can change the computing device settings so that the notification would be observable at the computing device for one or more types of notifications (e.g., pop-up or temporary notifications) but not one or more other types of notifications (e.g., tile or icon representations of an application).

For example, if the notification would not be observable at the computing device because the computing device is in a low power mode, UI update module 204 can bring the computing device to a higher power mode (e.g., by requesting a power mode change by the appropriate operating system component or module) in which the notification would be observable at the computing device. By way of another example, if the notification would not be observable at the computing device because the display device is powered off, UI update module 204 can have the display device powered on (e.g., by requesting that the appropriate operating system component or module power on the display device).

Thus, in some situations a notification would not be observable at the computing device due to the current settings of the computing device. Numerous notifications can thus end up not being presented by the computing device despite the metadata indicating when notifications are to be presented. However, in response to the computing device subsequently transitioning or returning to settings in which a notification would be observable at the computing device, UI update module 204 determines which notifications to present for applications. An application can provide multiple notifications to notification system 200, and UI update module 204 identifies the appropriate one of those multiple notifications to present based at least in part on the metadata for the notifications indicating when the notifications are to be presented. In one or more embodiments, UI update module 204 presents the most recent notification for the application (the notification, based on the indications of when the notifications are to be presented, that was to have been presented most recently), if the lifetime of the most recent notification indicates the notification can still be presented. If the lifetime of the most recent notification for an application indicates that the notification is no longer to be presented, then UI update module 204 can present the next most recent notification for the application, or alternatively present other data or no data (e.g., display a blank notification).

It should be noted that due to the UI not being updated if a notification would not be observable at the computing device, situations can arise in which some notifications are dropped or ignored. Dropped or ignored notifications can be deleted from notification store 208. If the notification includes an indication of a time when one notification (e.g., notification A) is to be presented, but notification A would not be observable at the computing device and another notification (e.g., notification B) is subsequently to be displayed for the application while notification B would not be observable at the computing device, then notification A can be dropped or ignored by notification system 200. The UI need not be updated to present notification A because by the time the notification would be observable at the computing device notification A would already be replaced by notification B.

For example, assume one notification at a time can be displayed for an application and that the application provides five notifications to notification system 200: notification A to be displayed at 1:00 pm on 1/1/2013, notification B to be displayed at 2:00 pm on 1/1/2013, notification C to be displayed at 3:00 on 1/1/2013, notification D to be displayed at 4:00 pm on 1/1/2013, and notification E to be displayed at 5:00 pm on 1/1/2013. Further assume that a display device of the computing device implementing notification system 200 is powered off at 11:00 am on 1/1/2013 and is not powered on again until 4:30 pm on 1/1/2013. In response to the display device being powered on, UI update module 204 determines that notifications A, B, and C would already be replaced, and module 204 thus can drop or ignore notifications A, B, and C, and display notification D.

In one or more embodiments, a notification is a single presentation notification in which the same content is presented in a single frame for the notification. For example, the notification displayed as representation 114 of FIG. 1 can include content that identifies "Seattle 75°/Cloudy" and a cloud icon. Alternatively, a notification can be a multiple presentation notification in which multiple different content is presented successively. The multiple presentation notification can display content for multiple notifications successively, and/or a single notification can include multiple frames of content that are presented successively. The number of notifications and/or frames to be displayed can be identified in different manners, such as by the application providing the notification (e.g., in metadata for the notification), by a configuration setting (optionally alterable by a user or administrator of the computing device) of UI update module 204, and so forth.

Figure 3:
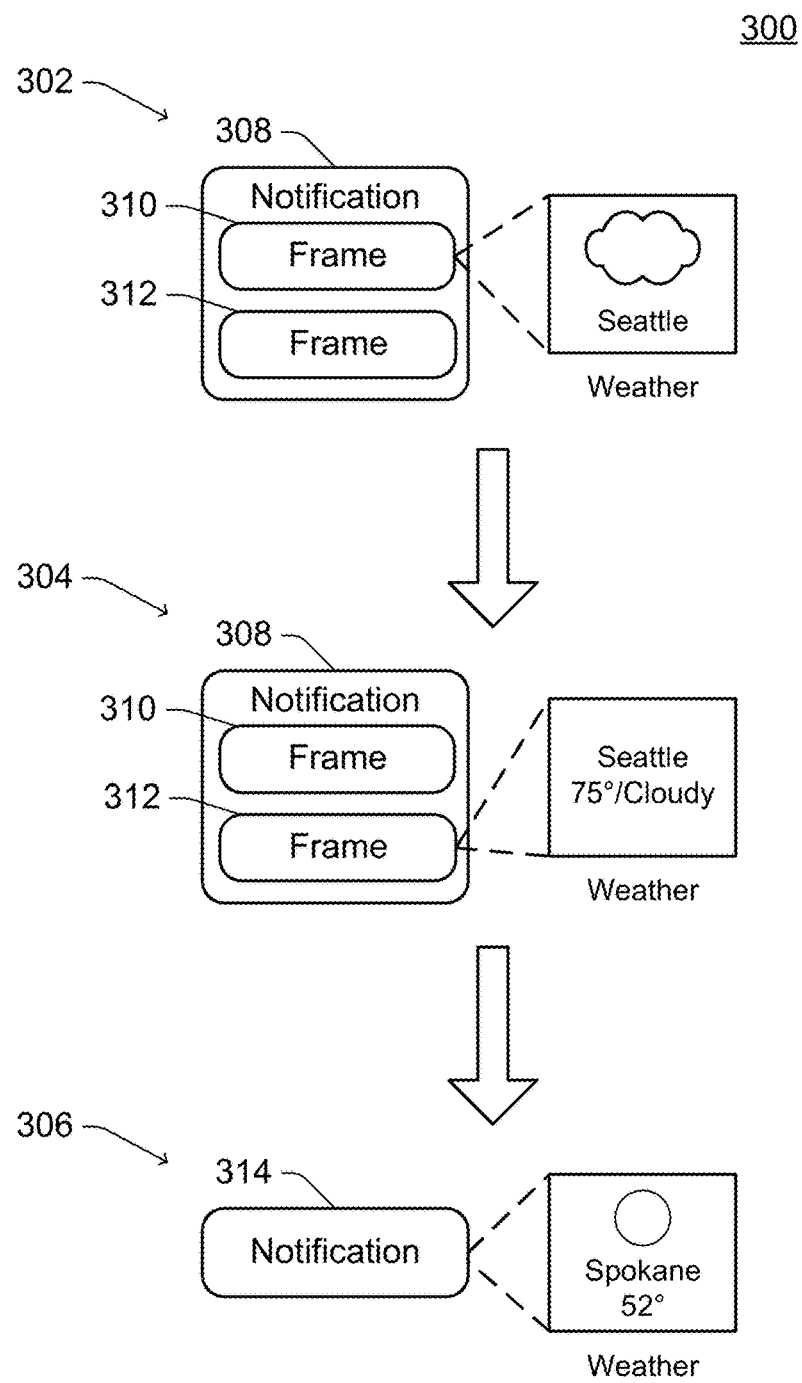
FIG. 3 depicts a system in an example implementation in which multiple notifications are displayed successively as part of a representation of an application in accordance with one or more embodiments.

FIG. 3 depicts a system 300 in an example implementation in which multiple notifications are displayed successively as part of a representation of an application in accordance with one or more embodiments. The system 300 is illustrated through use of first, second, and third stages 302, 304, and 306. Notifications can take a variety of different forms arranged in a variety of different ways for display as part of the representation of an application.

As illustrated in FIG. 3, for example, a notification 308 having multiple frames 310, 312 is shown. At the first stage 302, a frame 310 of notification 308 is used to display a graphical depiction of a cloud and the text "Seattle" for a representation of a weather application.

At the second stage 304, a frame 312 of notification 308 is used to display text "Seattle" and text "75°/Cloudy" to describe additional current weather conditions for Seattle. Thus, the notification 308 may be configured to include frames 310, 312 that are to be displayed successively as part of the notification for the weather application.

Additional notifications can also be displayed in succession as part of the representation for the application. As shown at the third stage 306, for example, a notification 314 is used to display graphics and text of a sun and current weather conditions for "Spokane 52°." Thus, in this example system 300 the UI update module (e.g., module 204 of FIG. 2) can be used to cycle through notifications 308, 314 for display as the notification for an application. The UI update module can repeat cycling through notifications 308, 314 (e.g., re-displaying notification 308 after displaying notification 314), or alternatively keep displaying just one notification or frame (e.g., notification 314).

Returning to FIG. 2, in response to the computing device transitioning or returning to settings in which a notification would be observable at the computing device, if the notification is a multiple presentation notification, then UI update module 204 determines which multiple notifications and/or frames of one or more notifications to present for an application successively. UI update module 204 can select a threshold number (e.g., five, or the number of notifications and/or frames to be displayed as indicated by the application providing the notifications) and present the most recent threshold number of notifications (and/or frames) for the application. If the lifetime of one or more of the most recent threshold number of notifications indicates that the notification is no longer to be presented, then UI update module 204 can present the next most recent notification for the application, present fewer than the threshold number of notifications, or alternatively present other data or no data (e.g., display a blank notification).

Thus, notification system 200 allows notifications for multiple applications to be displayed or otherwise presented in a power efficient manner. Applications need not remain running as background applications and/or resume execution in order to have their desired notifications displayed or otherwise presented. Furthermore, notification system 200 uses various power efficiency techniques to avoid updating a user interface to reflect notifications that would not be observable at the computing device anyway. For example, a notification that is to be displayed when the computing device is in a low power mode and/or the display device of the computing device is powered off is not displayed until the computing device is transitioned to a higher power mode and/or the display device is powered on—power is not expended to display or otherwise present a notification due to the computing device being in the low power mode and/or the display device being powered off. Thus, if twenty different notifications were to be displayed in a particular representation over the course of an hour during which the display device is powered off, when the display device is subsequently powered on only the last notification is displayed and power need not be expended to display the other nineteen notifications.

It should be noted that by avoiding updating a user interface to reflect notifications that would not be observable at the computing device anyway, various power savings are achieved. As the user interface is not updated, the various activities and operations involved in updating the user interface can be stopped and need not be performed, resulting in power savings. For example, obtaining information from a particular location, accessing a network, processing information for display or other presentation, modifying the user interface, and so forth need not be performed.

In one or more embodiments, notification system 200 supports different categories of notifications, such as a scheduled notification category and a periodic notification category. The category of a particular notification is identified by the application providing the notification to notification system 200 (e.g., based on the method of an API of application interface 206 that is invoked by the application, indicated in metadata for the notification, and so forth). The scheduled notification category refers to notifications that are to be presented at a scheduled time, and remain presented until replaced by another notification (or after a lifetime of the notification elapses) The periodic notification category refers to notifications that are to be updated or replaced at particular (regular and/or irregular) intervals. At the particular intervals, UI update module 204 obtains replacement content for the notification (e.g., from a location identified in the notification) and presents the replacement content in place of the previously presented content.

UI update module 204 can manage the different categories of notifications differently. In one or more embodiments, UI update module 204 updates the UI to present a scheduled notification within one threshold amount of time (e.g., one second) of when the scheduled notification is to be presented (as indicated in metadata of the notification). However, UI update module 204 does not update the UI (optionally depending on the type of notification as discussed above) to present the scheduled notification if a notification would not be observable at the computing device (e.g., due to a power mode of the computing device) as discussed above. Thus, for a scheduled notification, UI update module 204 adheres to a fairly fine time granularity for presenting notifications.

UI update module 204, however, updates the UI to present a periodic notification within another threshold amount of time (e.g., four minutes) of when the periodic notification is to be presented (as indicated in metadata of the notification). However, UI update module 204 does not update the UI (optionally depending on the type of notification as discussed above) to present the periodic notification if a notification would not be observable at the computing device (e.g., due to a power mode of the computing device) as discussed above. Thus, for a periodic notification, UI update module 204 adheres to a coarser time granularity for presenting notifications.

Additionally, in one or more embodiments a periodic notification identifies a location where the content to be displayed for the notification is to be obtained. UI update module 204 obtains the content from another device or service at a frequency or interval specified in the metadata for the periodic notification (subject to the time granularity discussed above). The metadata for the periodic notification can include a time indicating when UI update module 204 is to begin obtaining the content from the other device or service, or alternatively the time can be inherent in the request (e.g., begin at the time the request is received, begin at the first interval amount of time after the request is received, etc.).

In one or more embodiments, UI update module 204 obtains content from another device or service (e.g., service 122 of FIG. 1). In such embodiments, if content is to be obtained for multiple notifications (from the same and/or different applications), then UI update module 204 can batch together or coalesce the requests for the content. UI update module 204 can thus send multiple requests to obtain the content for multiple notifications close together in time, and then can wait a threshold amount of time (e.g., 5-10 minutes) before obtaining content for one or more other notifications. By batching together or coalescing the requests for content, the frequency with which various resources of the computing device (e.g., a network adapter and/or other networking components, processors, storage devices, etc.) are powered on can be reduced, thereby conserving power in the computing device.

As discussed above, application interface 206 can be an API exposing one or more methods that can be invoked by applications. The following are examples of API methods that can be included in application interface 206. It is to be appreciated that these API methods are examples, and that other API methods can alternatively be used.

Table I illustrates an example of a constructor that creates and initializes a new instance of a ScheduledTileNotification object, which is maintained in notification store 208. The ScheduledTileNotification object is an example of a scheduled notification category notification.

TABLE I

```
public ScheduledTileNotification (
    XmlDocument content,
    DateTimeOffset deliveryTime
)
```

The method of Table I includes two parameters: a content parameter and a deliveryTime parameter. The content parameter provides the notification data, which includes the content to be displayed or otherwise presented for the notification as well as the metadata for the notification. In one or more embodiments, the content is an xml document having a known format (e.g., known to notification system 200 and the application), although other data identification techniques can alternatively be used, such as JavaScript Object Notation (JSON), binary formats, images, and so forth. The deliveryTime parameter provides the time at which the notification is to be displayed or otherwise presented. The deliveryTime parameter can be various known formats, such as a particular date and time, an offset from a current date and time, and so forth.

Table II illustrates an example of a StartPeriodicUpdate method that begins a series of timed content changes for a notification, beginning upon invoking the method. In response to the StartPeriodicUpdate method being invoked, a notification object is created and maintained in notification store 208. The StartPeriodicUpdate method results in creation of an object that is an example of a periodic notification category notification.

TABLE II

```
public void StartPeriodicUpdate (
    Uri tileContent,
    PeriodicUpdateRecurrence requestedInterval
)
```

The method of Table II includes two parameters: a tileContent parameter and a requestedInterval parameter. The tileContent parameter identifies a URI from which the content to be displayed or otherwise presented for the notification (and optionally metadata for the notification) is to be obtained. In one or more embodiments, the content is an xml document having a known format (e.g., known to notification system 200 and the application and/or service storing the xml document), although other data identification techniques can alternatively be used, such as JavaScript Object Notation (JSON), binary formats, images, and so forth. The requestedInterval parameter identifies the frequency with which the URI is accessed for new content to be displayed or otherwise presented for the notification.

Figure 4:
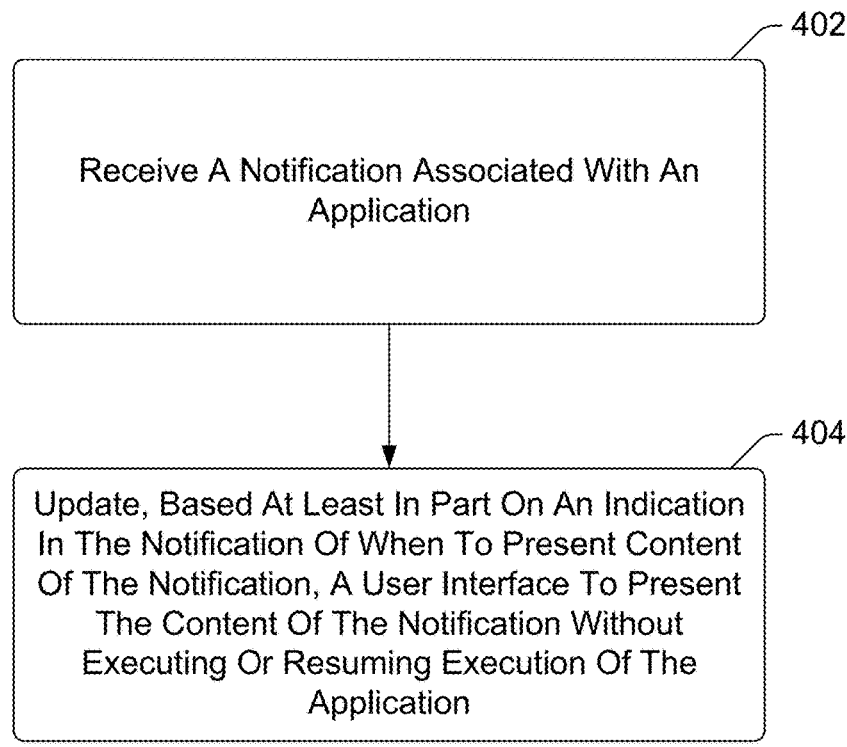
FIG. 4 is a flowchart illustrating an example process for implementing a power efficient application notification system in accordance with one or more embodiments.

FIG. 4 is a flowchart illustrating an example process 400 for implementing a power efficient application notification system in accordance with one or more embodiments. Process 400 is carried out by a notification system of a device, such as notification system 112 of FIG. 1 or notification system 200 of FIG. 2, and can be implemented in software, firmware, hardware, or combinations thereof. Process 400 is shown as a set of acts and is not limited to the order shown for performing the operations of the various acts. Process 400 is an example process for implementing a power efficient application notification system; additional discussions of implementing a power efficient application notification system are included herein with reference to different figures.

In process 400, a notification associated with an application is received (act 402). The notification can be received from the application and include both metadata for the notification and content for the notification as discussed above. The notification can alternatively include, rather than the content for the notification, an indication of where the content for the notification can be obtained as discussed above.

A user interface is updated to present the content for the notification at a time based at least in part on an indication included in the metadata for the notification of when to present the content (act 404). The time at which the user interface is updated can also be based at least in part on whether the notification would be observable at the device as discussed above. The content for the notification is presented regardless of whether execution of the application is terminated or suspended, and without executing or resuming execution of the application, as discussed above.

Figure 5:
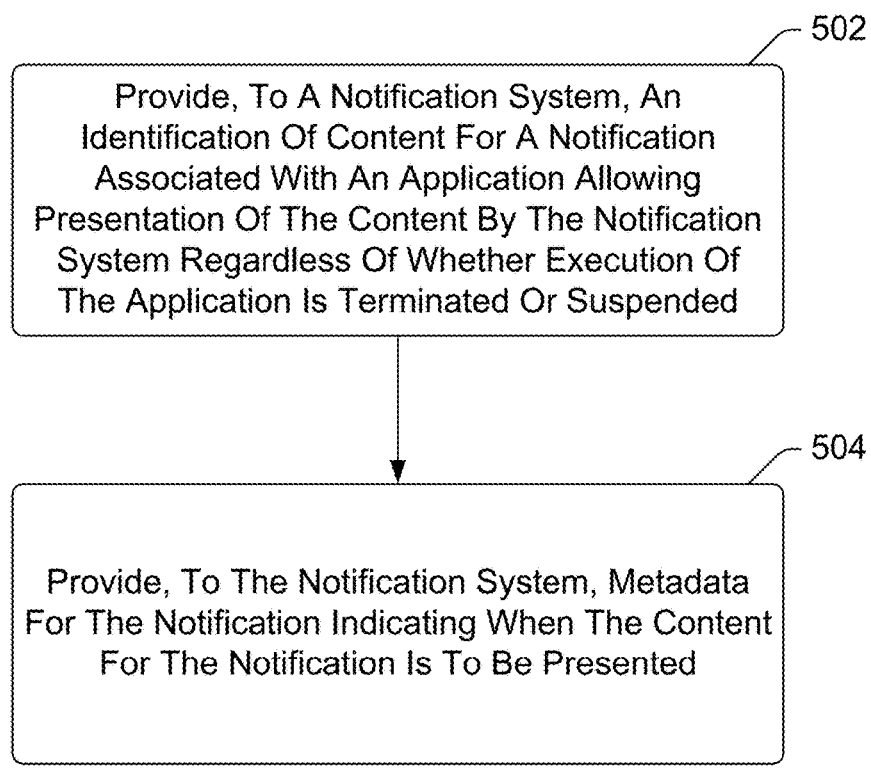
FIG. 5 is a flowchart illustrating an example process for invoking a power efficient application notification system in accordance with one or more embodiments.

FIG. 5 is a flowchart illustrating an example process 500 for invoking a power efficient application notification system in accordance with one or more embodiments. Process 500 is carried out by an application on a device, such as an application 106 of FIG. 1. Process 500 is typically implemented in software, but can alternatively be implemented at least in part in firmware and/or hardware, or in a combination of software, firmware, and/or hardware. Process 500 is shown as a set of acts and is not limited to the order shown for performing the operations of the various acts. Process 500 is an example process for invoking a power efficient application notification system; additional discussions of invoking a power efficient application notification system are included herein with reference to different figures.

In process 500, an identification of content for a notification associated with the application implementing process 500 is provided to a notification system (act 502). The notification is provided to the notification system to allow the notification system to present the content of the notification regardless of whether execution of the application is terminated or suspended at the time of presentation of the content as discussed above. The identification of content provided by the application can be the content to be presented for the notification, or an indication of where the content to be presented for the notification can be obtained as discussed above.

Metadata for the notification is also provided to the notification system by the application implementing process 500 (act 504). The metadata for the notification indicates when the content for the notification is to be presented, and can also include additional metadata as discussed above.

Various actions such as communicating, receiving, sending, obtaining, and so forth performed by various modules are discussed herein. A particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 6:
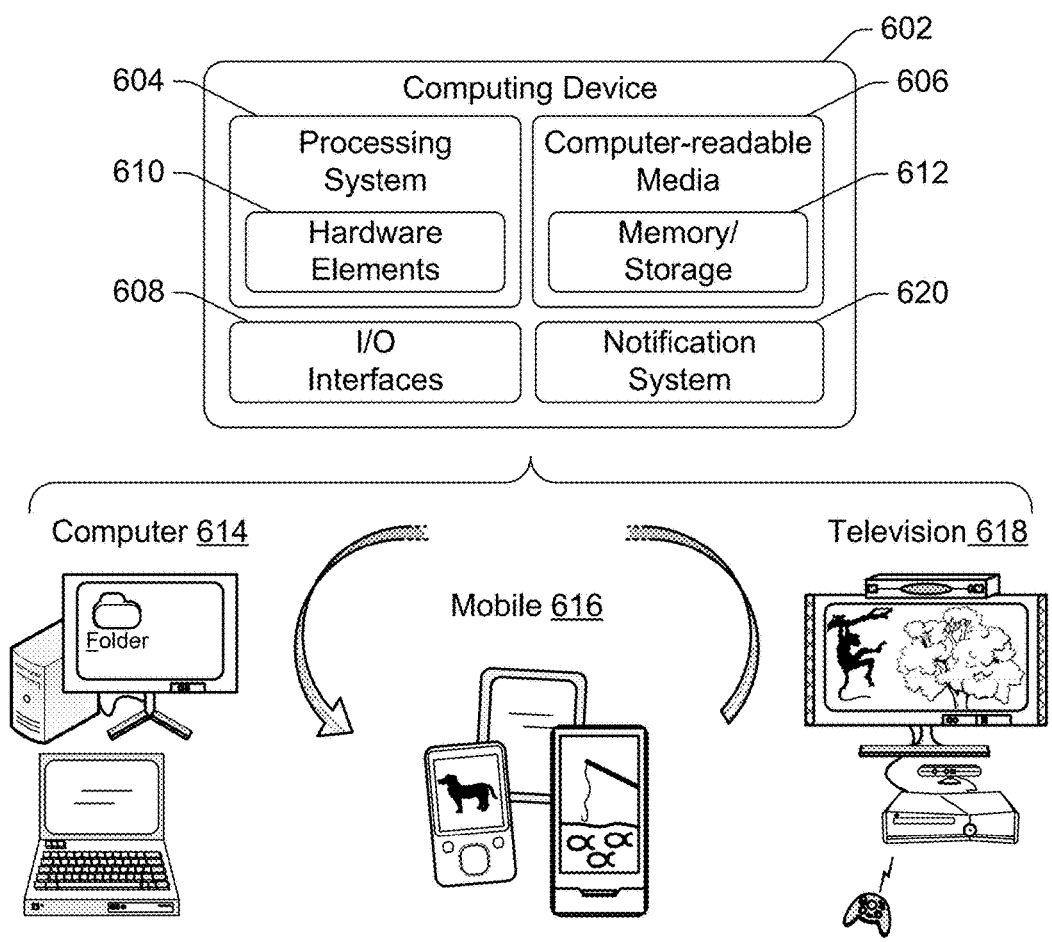
FIG. 6 illustrates an example system that includes an example computing device that is representative of one or more computing systems and/or devices that may implement the various techniques described herein.

FIG. 6 illustrates an example system generally at 600 that includes an example computing device 602 that is representative of one or more computing systems and/or devices that may implement the various techniques described herein. The computing device 602 may be, for example, a device associated with a user (e.g., a computing device 102 of FIG. 1), a server of a service (e.g., service 122 of FIG. 1), an on-chip system, and/or any other suitable computing device or computing system.

Computing device 602 as illustrated includes a processing system 604, one or more computer-readable media 606, and one or more I/O Interfaces 608 that are communicatively coupled to one another. Although not shown, computing device 602 may further include a system bus or other data and command transfer system that couples the various components to one another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

Processing system 604 is representative of functionality to perform one or more operations using hardware. Accordingly, processing system 604 is illustrated as including hardware elements 610 that may be configured as processors, functional blocks, and so forth. This may include implementation in hardware as an application specific integrated circuit or other logic device formed using one or more semiconductors. Hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

Computer-readable media 606 is illustrated as including memory/storage 612. Memory/storage 612 represents memory/storage capacity associated with one or more computer-readable media. Memory/storage 612 may include volatile media (such as random access memory (RAM)) and/or nonvolatile media (such as read only memory (ROM), Flash memory, optical disks, magnetic disks, and so forth). Memory/storage 612 may include fixed media (e.g., RAM, ROM, a fixed hard drive, and so on) as well as removable media (e.g., Flash memory, a removable hard drive, an optical disc, and so forth). Computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, a tactile-response device, and so forth. Thus, computing device 602 may be configured in a variety of ways as further described below to support user interaction.

Computing device 602 also includes a notification system 620. Notification system 620 manages notifications that are to be presented as discussed above. Notification system 620 can be, for example, notification system 112 of FIG. 1 or notification system 200 of FIG. 2.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 610. Computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system. The instructions and/or functions may be executable/operable by one or more articles of manufacture (for example, one or more computing devices 602 and/or processing systems 604) to implement techniques, modules, and examples described herein.

In various implementations, computing device 602 may assume a variety of different configurations, such as for computer 614, mobile 616, and television 618 uses. Each of these configurations includes devices that may have generally different constructs and capabilities, and thus computing device 602 may be configured according to one or more of the different device classes. The techniques described herein may be supported by these various configurations of computing device 602 and are not limited to the specific examples of the techniques described herein. For instance, computing device 602 may be implemented as the computer 614 class of a device that includes a personal computer, desktop computer, a multi-screen computer, laptop computer, netbook, and so on.

Computing device 602 may also be implemented as the mobile 616 class of device that includes mobile devices, such as a mobile phone, portable music player, portable gaming device, a tablet computer, a multi-screen computer, and so on. Computing device 602 may also be implemented as the television 618 class of device that includes devices having or connected to generally larger screens in casual viewing environments. These devices include televisions, set-top boxes, gaming consoles, and so on.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a computing device comprising:
    providing, by one or more applications and to a notification system of the computing device, an identification of respective contents for two or more notifications associated with the one or more applications for cyclic presentation by the notification system of the respective contents within respective representations of the one or more applications in a user interface (UI), the UI presented by the notification system, each of the one or more applications and the notification system not being a same application, the UI containing a plurality of representations of applications presented by the notification system, the respective representations of the one or more applications being of the plurality of representations of applications contained in the UI; and
    the providing causing the notification system to, for each of the one or more applications:
        maintain, by the notification system, the two or more notifications after the one or more applications associated with the two or more notifications have ceased execution;
        determine, in response to the computing device transitioning to a state in which the two or more notifications would be observable at the computing device and based on metadata for the two or more notifications indicating when the respective contents for the two or more notifications are to be presented, to present the two or more notifications;
        cycle presentation of the respective content of the two or more notifications within the respective representations of the one or more applications; and
        enable a user of the computing device to consume the respective contents of the two or more notifications:
            through the respective representations of the one or more applications;
            without execution of the one or more applications; and
            without input from the user of the computing device to the UI or to the respective representations of the one or more applications.

2. The method of claim 1, wherein each of the two or more notifications comprises at least a portion of the metadata.

3. The method of claim 2, wherein the metadata for each of the two or more notifications indicates when or how the respective content for each of the two or more notifications is to be presented.

4. The method of claim 3, wherein the metadata indicates at least one date and at least one time when individual notifications of the two or more notifications are to be presented and at least one lifetime after which the individual notifications are to no longer be presented.

5. The method of claim 2, wherein at least one of the two or more notifications comprises a multiple presentation notification in which pieces of the respective contents are presented successively.

6. The method of claim 1, wherein the respective contents for the two or more notifications comprises information for individual notifications that is presented by the notification system for consumption by the user.

7. The method of claim 1, wherein the respective contents defines audio output or haptic output.

8. The method of claim 1, wherein the respective contents includes an indication of a location to be accessed by the notification system to obtain the content for the notifications, and the metadata for the notifications indicates a frequency with which the location is to be accessed by the notification system to obtain the content for the notifications.

9. The method of claim 8, wherein the location comprises a path identifying a file in a file system, a uniform resource locator (URL), a uniform resource indicator (URI), a device, or a service.

10. The method of claim 1, wherein the notification system supports different categories of notifications, the different categories of notifications including a scheduled notification category and a periodic notification category.

11. The method of claim 1, wherein the cyclic presentation of the respective content of the two or more notifications repeats.

12. The method of claim 1, further comprising employing various power efficiency techniques to determine which notifications are presented and when the UI is updated to reflect those notifications in order to avoid updating the UI to reflect notifications that would not be displayed due to a low-power mode of the computing device.

13. The method of claim 1, wherein the providing the identification of respective contents for two or more the notifications causes the computing device to invoke an application programming interface (API) method exposed by the notification system.

14. A computing device comprising:
one or more processors; and
one or more computer-readable storage media having stored thereon computer-executable instructions that, when executed by the one or more processors, cause the computing device to:
receive, from an application that is installed on the computing device and at a notification system of the computing device, a plurality of notifications associated with the application for cyclic presentation by the notification system within a representation of the application in a user interface (UI) of the notification system, wherein the notification system is a component of an operating system that is different than the application;
maintain, by the notification system, the plurality of notifications after the application associated with the plurality of notifications has ceased execution on the computing device;
determine, in response to the computing device transitioning to a state in which the plurality of notifications would be observable at the computing device, to present the plurality of notifications;
cycle presentation of the plurality of notifications within the representation of the application in the UI of the notification system; and
enable a user of the computing device to consume content of the plurality of notifications:
through the representation of the application in the UI of the notification system; and
without resuming execution of the application on the computing device.

15. The system of claim 14, wherein individual notifications of the plurality of notifications comprises content and metadata.

16. The system of claim 15, wherein the content for the individual notifications comprises information for presentation by the notification system for consumption by the user.

17. The system of claim 15, wherein the metadata for the individual notifications indicates when or how the respective content for the individual notifications is to be presented.

18. The system of claim 15, wherein at least one of the individual notifications comprises a multiple presentation notification in which pieces of the content are presented successively.

19. The system of claim 14, wherein the notification system supports different categories of notifications, the different categories of notifications including a scheduled notification category and a periodic notification category.

20. The system of claim 14, wherein the cyclic presentation of the notifications repeats.

* * * * *